United States Patent Office 3,424,693
Patented Jan. 28, 1969

3,424,693
MIXTURE OF SURFACE-ACTIVE COMPOUNDS
AND PROCESS FOR PREPARING SAME
Werner Stein, Erkrath-Unterbach, and Horst Baumann and Manfred Voss, Hilden, Rhineland, Germany, assignors to Henkel & Cie. G.m.b.H., Dusseldorf-Holthausen, Germany, a corporation of Germany
No Drawing. Filed July 15, 1964, Ser. No. 382,925
Claims priority, application Germany, Aug. 1, 1963,
H 49,878
U.S. Cl. 252—355                    12 Claims
Int. Cl. C11d 1/37, 1/12, 1/14

ABSTRACT OF THE DISCLOSURE

The present invention relates to a process for the preparation of mixtures of surface-active compounds containing aliphatic sulfonates and sultone reaction products by reacting an α-olefin with from 1 mol to 1.7 mols of gaseous sulfur trioxide at a temperature below 70° C., neutralizing the crude sulfonation mixture with from 50% to 95%, based on the amount of sulfur trioxide reacted, of an alkaline neutralization agent, reacting the sultones present in the partially neutralized mixture with a sultone-reacting reagent, bleaching the mixture and recovering said mixture.

In copending, commonly assigned U.S. patent application Ser. No. 242,563, filed Dec. 5, 1962, now Patent No. 3,164,609, sultones are prepared by reacting an α-olefin, unsubstituted in the α, β and γ positions, with sulfur trioxide, whereby less than 1 mol, preferably about 0.2–0.7 mol, of sulfur trioxide per mol of olefin is employed. In this application it was ascertained that the use of larger amounts of SO₃ than about 0.7 mol, did not result in any substantial increase in the sultone content of the reaction mixture, whereas the formation of alkenyl sulfonates, having unsaturated radicals, increases with an increase in the amount of SO₃.

It is an object of the present invention to produce a mixture of surface-active compounds having improved surface-active characteristics by reacting an α-olefin having from 8 to 22 carbon atoms, with from about 1 mol to about 1.7 mols of gaseous sulfur trioxide at a temperature below 70° C., reacting the crude sulfonation mixture with a sultone-reacting product and recovering said mixture of surface-active compounds.

A further object of the present invention is to produce a mixture of surface active compounds having improved foaming stability by the neutralization of sultone reaction products formed by the action of gaseous sulfur trioxide on an α-olefin, and thereafter reacting the sultones present in said neutralized reaction product with a sultone-reacting compound.

Another object of the invention is the development of a process for the preparation of a mixture of surface-active compounds which comprises the steps of reacting an α-olefin having the formula

wherein $R_1$, $R_2$ and $R_3$ are selected from the group consisting of hydrogen and aliphatic hydrocarbon, said olefin containing from 8 to 22 carbon atoms, with from about 1 mol to about 1.7 mols of gaseous sulfur trioxide at a temperature below 70° C., neutralizing the crude sulfonation mixture with from 50% to 95%, based on the amount of sulfur trioxide reacted, of an alkaline neutralization agent, reacting the sultones present in the neutralized sulfonation mixture with a sultone-reacting product, and recovering said mixture of surface-active compounds.

A further object of the invention is the obtention of mixtures of surface-active compounds by the process of the invention.

These and other objects of the invention will become more apparent as the description thereof proceeds.

It has been discovered that mixtures of surface-active compounds with favorable foaming properties may be prepared by sulfonating α-olefins with 8–22 carbon atoms using mixtures of sulfur trioxide and inert gases, whereby the sulfur trioxide is used in an amount of 1 to 1.7 mols per mol of olefin, and by subsequently reacting the sulfonation mixture with substances other than water, which are capable of reacting with sultones. In this way, not only those sultones which are present in the mixture are reacted, but also other sulfonic acid esters produced by the sulfonation reaction. This gives surface-active mixtures of compounds which have especially valuable properties.

It is known that sultones react with a large number of alkylating compounds, in particular those containing a reactive hydrogen atom. These compounds are preferably reacted with sultones in form of their salts, in particular in their alkali metal or ammonium salts, or in the presence of an acid-binding agent. Such suitable sultone-reacting compounds are e.g. alcohols, phenols, hydroperoxides, carboxylic acids, primary or secondary amines, imines, carboxylic acid or sulfonic acid amides, carboxylic acid or sulfonic acid imides, oximes, as well as compounds containing SH— groups, such as mercaptans, thio acids, dithio acids, xanthogenic acids, dithiocarbamic acids, trithiocarbonic acids and sulfinic acids. These compounds may contain aliphatic, cycloaliphatic or aromatic substituents. Furthermore, they may contain one or several of the named reactive groups. Also salts of simple inorganic acids, e.g. of hydrohalic acids, thiocyanic acids, thio-sulfuric acid and hydrogen sulfide may be reacted with sultones.

Some compounds containing active hydrogen are also capable of being reacted with sultones without requiring the simultaneous presence of an acid-binding agent or without the compound being present in a salt form. Such compounds are thiourea and its nitrogen-substituted derivatives, also sulfonic acid amines and hydrohalic acids. Furthermore, compounds whose reactivity is not predicated on an active hydrogen atom but on an atom transformable into a higher coordination number, may be reacted with sultones, for example, tertiary amines, thioethers and tertiary phosphines.

Since the reaction of the sultones present in the sulfonation mixture is accomplished in the presence of large amounts of foreign substances and, moreover, in many cases in the presence of water, the sultones in the process according to the invention are reacted preferably with such substances, which react rapidly and vigorously. Such substances are amines, in particular trialkylamines containing from 3 to 20 carbon atoms, such as trimethylamine or triethylamine, or tertiary amines containing a long-chain aliphatic radical in the molecule, such as octyldimethylamine or dodecyldimethylamine. Also cycloaliphatic, aromatic and heterocyclic amines are suitable, for example dialkylphenylamines having 8 to 20 carbon atoms, cycloalkylamines having 5–6 carbon atoms, dialkylcycloalkylamines having from 8 to 20 carbon atoms, dicycloalkylamines having 10 to 12 carbon atoms, such as cyclohexylamine, dicyclohexylamine, dimethylcyclohexylamine, aniline, dimethylaniline, pyridine, alkylpyridines, piperidine, N-alkyl piperidines having 7 to 20 carbon atoms, and many others.

Furthermore, alcoholates or phenolates are suitable, particularly the alkali metal alkanolates having from 1 to 22 carbon atoms such as sodium methylate, sodium ethylate, potassium octylate, sodium dodecylate; alkali metal phenolates and substituted phenolates, such as sodium phenolate as well as salts of various substituted phenols such as sodium trichlorophenolate, potassium nonylphenolate and similar ones. Especially rapid is the reaction of the sultones with compounds containing SH— groups. Suitable substances are for instance alkali metal or ammonium salts of mercaptans such as alkanethiols, thiophenols, N-substituted dithiocarbamic acids such as N,N-diethyldithiocarbamic acid, trithiocarbonic acid, mercaptobenzothiazole, 2,5-dimercapto-1,3,4-thiadiazole and many others.

The crude sulfonation mixtures which are reacted with the aforenamed sultone-reaction compounds, can be prepared in a simple manner by reacting α-olefins with 8–22 carbon atoms and sulfur trioxide in form of mixtures with inert gases.

The α-olefins with 8–22 carbon atoms which serve as starting materials may be of straight-chain or branched-chain form and may also contain cycloaliphatic groups. However the α-olefins must be unsubstituted on the α, β and γ carbon atoms. The olefins need not be in pure form, they also may contain small amounts of paraffins or olefins with non-terminal double bond. Of particular practical significance are mixtures of terminal olefins prepared by the cracking of paraffin waxes, and which may technically be prepared in 90% or higher purity.

The gaseous sulfur trioxide serving as sulfonation agent, is diluted with inert gas, wherein the sulfur trioxide concentration of the gaseous mixture may amount to 1–20 volume percent, preferably 2–10 volume percent. As an inert gas, air or nitrogen are preferable. However, other gases are suitable, such as carbon dioxide or sulfur dioxide. For good results, it is preferable to proceed in such manner that the inert gas is passed through heated oleum or liquid, if necessary, heated sulfur trioxide, or by another method, $SO_3$ is evaporated in an inert gas stream. It is also possible to oxidize sulfur dioxide catalytically to sulfur trioxide, said sulfur dioxide diluted with air or oxygen being obtained by burning of sulfur or by roasting of sulfur-containing material. Such mixtures can be employed directly for the sulfonation reaction. The presence of small amounts of sulfur dioxide does not interfere.

The sulfonation may be accomplished according to well known methods. In the simplest way a stream of gas containing sulfur trioxide is introduced into the olefin to be sulfonated. The sulfonation may be accomplished continuously or intermittently by concurrent or contracurrent flow. As a rule, the sulfonation is accomplished at temperatures between 0° and about 70° C. It is preferable, however, to work in a temperature range of from about 25° C. to about 50° C.

To obtain an efficient degree of sulfonation, it is expedient to use at least about 1 mol of sulfur trioxide per mol of olefin. Preferably 1.1 to 1.3 mols of sulfur trioxide per mol of olefin are used. A greater excess up to about 1.7 mols of $SO_3$ per mol of olefin can be used if desired.

The crude reaction product may be directly reacted with the sultone-reacting reagents, however, the sulfonation products contain a more or less greater portion of acid reaction products in addition to the sultones. To keep the amount of sultone-reacting reagents as small as possible, it has been found to be advantageus to neutralize the crude sulfonation product prior to reacting with the sultone reagents. In general, about 50% to 95%, preferably 60% to 90%, based on the amount of sulfur trioxide absorbed by the sulfonation mixture of an alkaline reacting neutralization agent is utilized, assuming that for 1 mol of sulfur trioxide, one mol equivalent of the alkaline neutralization agent is required. By varying the amount of alkaline neutralization agent utilized for the neutralization, it is possible to adjust the content of the end product with regard to sultone reaction products as desired.

For the neutralization, it is possible, depending upon the intended use of the end product, to use as alkaline neutralization agents, alkali metal and ammonium hydroxides, in particular sodium or potassium hydroxides; also alkali metal and ammonium carbonates; primary, secondary or tertiary amines, such as alkylamines, for example butylamine; dialkylamines, for example dibutylamine, diethylamine; trialkylamines, for example trimethylamine, triethylamine, tributylamine; alkylolamines, for example propanolamine; dialkylolamines, for example diethanolamine; trialkylolamines, for example triethanolamine; and other bases. These bases may be used in form of aqueous or lower alkanolic solutions. In addition, alkali metal lower alkanolates in suitable organic solvents may be utilized for the neutralization. Specifically preferred are solutions of sodium or potassium lower alkanolates in the respective alcohol, especially methanol or ethanol.

As a rule, the sultone-reacting reagents are used in an amount sufficient for reaction with the sultones and other reactive sulfonic acid esters present in the reaction mixture. Generally, the content of sultones and other reactive sulfonic acid esters present in the reaction mixture amounts to about 0.1 to 0.5 mol per mol of starting olefin.

According to the reactivity of the sultone-reacting reagents utilized, the reaction of these materials with the crude sulfonation mixture may be accomplished at room temperature or at elevated temperatures. As a rule, it is advantageous to conduct the reaction at temperatures between about 40° C. and 200° C. Furthermore it is preferable to conduct the reaction under agitation. The concurrent use of organic solvents or diluents, such as lower alkanols or lower alkanones, is feasible and even advisable when dealing with very viscous products. The presence of water generally does not disturb the reaction.

The bases used for the neutralization may, in some cases, be added simultaneously with the sultone-reacting reagents. For instance, the crude sulfonation products may be reacted with an aqueous or lower alkanolic mixture of an alkali metal hydroxide such as sodium hydroxide and a trialkylamine such as trimethylamine.

To obtain products of a light color, it is usually necessary to subject the mixture of surface-active compounds to a bleaching treatment. For practical reasons this is done after the reaction with the sultone-reacting reagent. The bleaching is conducted with ordinary bleaching agents, such as hydrogen peroxide, sodium hypochlorite or chlorite, generally at temperatures between 20° to 100° C., preferably 40° to 60° C. The amount of the bleaching agent required varies with each case. When working with hydrogen peroxide, as a rule about 0.5 to 10%, preferably 2 to 6% is used, based on the amount of the mixture to be bleached. (The percentages given are based on the weight of anhydrous $H_2O_2$, based on the anhydrous sulfonation product.) The required amount of bleaching agent is best ascertained by a preliminary test.

It has been found especially practical to accomplish the bleaching treatment in neutral to weakly alkaline media using a hypochlorite. The bleaching may be advantageously conducted by introducing chlorine under steady agitation into the alkaline-adjusted reaction product. Especially satisfactory results have been obtained with a 2-step bleaching process; in the first step, the bleaching is done under neutral to weakly acid conditions with hydrogen peroxide, in the second step with hypochlorite or chlorite.

The mixtures of surface-active compounds prepared according to the process of the invention exhibit various characteristics depending on the sultone-reacting reagents used. If an amine, such as dodecyldimethylamine, has been used as the sultone-reacting reagent, the reaction products show an advantageous, foam-stabilizing effect. The use of said reaction mixtures in laundry and cleaning agents gives agents with especially satisfactory foam stability. In other cases, with the employment of sultone-reacting reagents containing sulfur, or sulfur and nitrogen, such as mercaptobenzothiazole or thiourea, the sultone reaction products impart a satisfactory corrosion-inhibiting effect to the mixtures. The reaction with tertiary amines frequently yields compounds having good disinfecting or bacteriostatic properties.

The following specific embodiments are illustrative of the invention. They are, however, not to be deemed limitative. Other expedients known to those skilled in the art, or outlined above, may be employed.

EXAMPLE I 278 g. (1.2 mols) of a $C_{14}$ to $C_{18}$ α-olefin mixture (with an average chain length of sixteen carbon atoms) were sulfonated in a 3-neck sulfonation reactor of two-liter capacity. The sulfonation reactor was provided with a thermometer, a gas-feed tube extending to the bottom of the flask, a gas outlet and a high-speed stirrer. The sulfonation of the olefin mixture was accomplished by injecting a stream of 120 g. of $SO_3$ (1.5 mols), in form of about a 4 volume percent of $SO_3$ in air, over a period of 1 hour while vigorously agitating. By exterior cooling, the reaction temperature was maintained between 25° to 40° C.

After sulfonation was completed, the viscous sulfonation product, weighing 398 g., was admixed in small portions, while cooling and stirring, with a solution of 54 g. of NaOH (1.35 mols) (corresponding to 90% of the required NaOH for neutralization, based on absorbed $SO_3$) in 200 ml. of water. Subsequently, 100 ml. of an aqueous trimethylamine solution of about 40% were added, and the reaction mixture was heated for 2 hours in an alkali-resistant two-liter autoclave at 120° C. Thereafter, excess trimethylamine was distilled off. Next, the aqueous solution was neutralized with dilute sulfuric acid and spray-dried in a Krause spray-dryer at a temperature of 90° to 100° C. 448 g. of a solid yellow powder were obtained, said powder being easily soluble in water with formation of heavily foaming solutions. The product had the following characteristic values: acid No.=0; saponification No.=0; hydroxyl No.=56.5; iodine No.=25.4; nitrogen content=0.59%. Free trimethylamine as well as trimethylammonium sulfonate were no longer present in the product. On the basis of the analytical data the following approximate composition may be assumed for the solid product:

75% sodium $C_{14}$–$C_{18}$ olefin sulfonate (mixture of alkene and hydroxy-alkane sulfonates),
15% trimethylammonium-sulfobetaine, and
10% $Na_2SO_4$.

Prior to spray-drying the aqueous solution contained 6.1% of unsulfonated components (based on the olefin used), which were determined by extracting an aliquot portion of the total solution six times with gasoline.

In another batch of the same type, the product was bleached, prior to spray-drying with hypochlorite to improve the color. For this purpose the solution, after adding 4% sodium hypochlorite (based on the crude sulfonation product) was heated over a period of 2 hours at 50° to 60° C. accompanied by gentle agitation. Thus, a practically colorless spray-dried powder was obtained.

EXAMPLE II

With another batch of the same type as in Example I, the sulfonation product obtained, weighing 398 g., was admixed while cooling with a solution of 48 g. of NaOH (1.2 mols) (corresponding to 80%, of the required NaOH for neutralization, based on the absorbed $SO_3$) in 50 ml. of water and then with 200 ml. of an aqueous approximately 60% trimethylamine solution. Next, the mixture was heated for one hour at 160° C. in an alkali-resistant two-liter autoclave, and the aqueous solution obtained, after neutralization with dilute sulfuric acid, was spray-dried in the Krause spray-dryer. As an evaporation residue, 460 g. of solid powder were obtained, having the following characteristic values: acid No.=0; saponification No.=0; hydroxyl No.=35.2; iodine No. =27.0; nitrogen content=1.05%. Free trimethylamine as well as trimethylammonium sulfonate were no longer present in the solid product. On the basis of an analytical data the following composition for the solid product may be assumed:

62% sodium $C_{14}$–$C_{18}$ olefin sulfonate,
28% trimethylammonium-sulfobetaine, and
10% $Na_2SO_4$.

EXAMPLE III

With another batch of the same type as in Example I, the crude sulfonation product obtained, weighing 398 g., was admixed while cooling, with a solution of 0.98 mol. of sodium ethylate (corresponding to 65% of the required sodium ethylate for neutralization, based on the absorbed $SO_3$) in 200 ml. of absolute ethanol and then with 150 ml. of an approximately 50% trimethylamine solution in ethanol. Next, the mixture was heated for 2 hours at 140° C. in an alkali-resistant two-liter autoclave, and the solution obtained was, after neutralization with dilute sulfuric acid, spray-dried in the Krause spray-dryer. As evaporation residue there remained 453 g. of solid powder, having the following characteristic values: acid No.=0; saponification No.=0; hydroxyl No.=8.3; iodine No.=22.5; nitrogen content=1.07%. Based on the analytical data the following composition of the solid product may be assumed:

60% sodium $C_{14}$–$C_{18}$ olefin sulfonate (mixture of 30% alkene sulfonate and the rest ethoxylakane sulfonate in addition to a small amount of hydroxyalkane sulfonate),
30% trimethylammonium-sulfobetaine, and
10% $Na_2SO_4$

EXAMPLE IV 278 g. (1.2 mols) of a $C_{14}$–$C_{18}$ α-olefin mixture (with an average chain length of 16 carbon atoms) were sulfonated in the apparatus described in Example I. The sulfonation of the olefin mixture was accomplished by injecting 110 g. of $SO_3$ (1.38 mols) in the form of about 3 volume percent of $SO_3$ in an air stream, over a period of 1 hour under vigorous agitation. By exterior cooling, the reaction temperature was maintained between 25° to 40° C.

After completed sulfonation the viscous sulfonation product, weighing 388 g., was admixed in small portions, while agitating and cooling, with a solution of 32 g. of NaOH (0.8 mol, corresponding to 58% of the required NaOH for neutralization, based on the absorbed $SO_3$) in 150 ml. of water. The obtained viscous, yellow, partially neutralized sulfonation product was then admixed in small portions, while stirring at about 40° C. with a solution of 118 g. of 2,4,6-trichlorophenol (0.6 mol) in 300 ml. of an 8% sodium hydroxide solution. The intensively foaming reaction mixture was then refluxed over a period of 5 hours while agitating. Then the aqueous solution was neutralized with dilute sulfuric acid and spray-dried in the Krause spray-dryer at 90° to 100° C. Thereby, 429 g. of a yellow solid powder were obtained, which was soluble in water and formed vigorously foaming solutions therein. The product exhibited the following analytical data: acid No.=4.2; saponification No.=9.0; hydroxyl No.=35.6; iodine No.=30.0; Cl=8.16%; S=9.20%; Na=6.63%.

With another batch of the same type, the sulfonation product, partially neutralized with sodium hydroxide, was reacted with sodium 2,4,6-trichlorophenolate by heating for 3 hours at 130° C. in an autoclave. The aqueous solution was then bleached, prior to spray-drying, in two steps with $H_2O_2$ and hypochlorite. The solution, adjusted to a pH of 5 to 6, after the addition of 2% $H_2O_2$ (based on the crude sulfonation product), was heated for 1 hour while gently stirring at 80° to 90° C. Then the solution, adjusted to a pH of 7, after an addition of 2% sodium hypochlorite (based on the crude sulfonation product) was heated for 1 hour while gently stirring at 50° to 60° C. A practically colorless spray-dried powder was thus obtained.

EXAMPLE V 278 g. (1.2 mols) of a $C_{14}$–$C_{18}$ α-olefin mixture (with an average chain length of 16 carbon atoms) were sulfonated in the apparatus described in Example I. The sulfonation of the olefin mixture was accomplished by injecting 115 g. of $SO_3$ (1.44 mols) in form of about a 3 volume percent of $SO_3$ in an air stream over a period of 1 hour while vigorously agitating. By exterior cooling the reaction temperature was maintained between 25° and 40° C.

After completed sulfonation the viscous sulfonation product, weighing 393 g., was admixed in small portions while stirring and cooling, with a solution of 34 g. of NaOH (0.85 mol, corresponding to 59% of the required NaOH for neutralization, based on the absorbed $SO_3$) in 300 ml. of water. The obtained viscous, yellow, partially neutralized product was then admixed in small portions and under stirring at a temperature of about 40° C. with a solution of 0.6 mol of sodium N,N-diethyldithiocarbamate. This solution was prepared by the reaction of 45.5 g. of carbon disulfide (0.6 mol), 43.5 g. of diethylamine (0.6 mol, corresponding to 132 g. of 33% aqueous solution) and 300 ml. of an 8% sodium hydroxide solution. Finally, the intensely foaming reaction mixture was refluxed while agitating for 3 hours. After complete reaction, the aqueous solution was neutralized with dilute sulfuric acid and spray-dried at 90° to 100° C. in the Krause spray-dryer. 434 g. of a yellow solid powder were thus obtained, which was soluble in water and formed an intensely foaming solution therein. The product exhibited the following analytical data: acid No.=0.9; saponification No.=0.9; hydroxyl No.=8.0; N=1.62%; S=15.7%; Na=6.80%.

With another batch of the same type, the sulfonation product, partially neutralized with sodium hydroxide, was reacted with sodium N,N-diethyldithiocarbamate by heating the product in an autoclave at 120° C. for 2 hours.

EXAMPLE VI 278 g. of tridecene-1 (1.53 mols) were sulfonated in the apparatus described in Example I. The sulfonation of the olefin was accomplished by injecting 144 g. of $SO_3$ (1.8 mols) in form of about a 4 volume percent of $SO_3$ in an air stream over a period of 2 hours under intensive stirring. By exterior cooling the reaction temperature was maintained between 20° and 30° C.

After completed sulfonation the viscous sulfonation product, weighing 422 g., was neutralized according to the method described in Example IV, with a solution of 42 g. of NaOH (1.05 mols, corresponding to 58% of the required NaOH for neutralization based on the absorbed $SO_3$) in 250 ml. of water. The partially neutralized solution was then reacted with a solution of 150 g. of 2,4,6-trichlorophenol (0.76 mol) in 380 ml. of an 8% sodium hydroxide solution. By spray-drying in the Krause spray-dryer at a temperature of 90° to 100° C., 524 g. of a yellow solid powder were obtained with the following analytical data: acid No.=1.7; saponification No.=1.7; hydroxyl No. =20.4; iodine No.=30.8; Cl=9.23%; S=10.9%; Na=7.54%.

EXAMPLE VII 278 g. of tridecene-1 (1.53 mols) were sulfonated in the apparatus described in Example I. The sulfonation of the olefin was accomplished by injecting 144 g. of $SO_3$ (1.8 mols) in form of about a 4 volume percent of $SO_3$ in an air stream over a period of 2 hours while agitating continuously. By exterior cooling the reaction temperature was maintained between 20° and 30° C.

After complete sulfonation, the viscous sulfonation product, weighing 422 g., was neutralized according to the process described in Example V, with a solution of 42 g. of NaOH (1.05 mols, corresponding to 58% of the required NaOH for neutralization, based on the absorbed $SO_3$) in 250 ml. of water and then reacted with an aqueous solution of 0.76 mol of sodium N,N-diethyldithiocarbamate. This solution was prepared from 58 g. of carbon disulfide (0.76 mol), 55 g. (0.76 mol) of diethylamine and 380 ml. of an 8% sodium hydroxide. solution. By spray-drying in a Krause spray-dryer at a temperature of 90° to 100° C., 536 g. of a yellow solid powder were obtained with the following analytical data: acid No.=1.9; saponification No.=12.8; hydroxyl No.=30.1; N=2.01%; S=17.31%; Na=7.58%.

EXAMPLE VIII 278 g. of pentadecene-1 (1.32 mols) were sulfonated in the apparatus described in Example I. The sulfonation of the olefin was accomplished by injecting 126 g. of $SO_3$ (1.58 mols) in the form of about a 3 volume percent of $SO_3$ in an air stream over a period of 1½ hours while constantly stirring. By exterior cooling the reaction temperature was maintained between 25° to 35° C.

After complete sulfonation, the viscous sulfonation product, weighing 404 g., was neutralized, according to the process described in Example IV, with a solution of 36.4 g. of NaOH (0.91 mol, corresponding to 58% of the required NaOH for neutralization based on the absorbed $SO_3$) in 200 ml. of water and then reacted with a solution of 130 g. of 2,4,6-trichlorophenol (0.66 mol) in 330 ml. of an 8% sodium hydroxide solution. By spray-drying in the Krause spray-dryer at 90° to 100° C. 481 g. of a yellow solid powder were obtained with the following analytical data: acid No.=1.9; saponification No.=1.9; hydroxyl No.=22.1; iodine No.=34.8; Cl=8.40%; S=10.06%; Na=7.06%.

EXAMPLE IX 278 g. of pentacedene-1 (1.32 mols) were sulfonated in the apparatus described in Example I. The sulfonation of the olefin was accomplished by injecting 126 g. of $SO_3$ (1.58 mols) in the form of about a 3 volume percent of $SO_3$ in an air stream over a period of 1½ hours while constantly stirring. By exterior cooling, the reaction temperature was maintained between 25° to 35° C.

After complete sulfonation, the viscous sulfonation product, weighing 404 g., was neutralized in the manner described in Example V, with a solution of 36.4 g. of NaOH (0.91 mol, corresponding to 58% of the required NaOH for neutralization, based on the absorbed $SO_3$) in 200 ml. of water and then reacted with an aqueous solution of 0.66 mol of sodium N,N-diethyldithiocarbamate. This solution was prepared from 50 g. of carbon disulfide (0.66 mol), 48.5 g. of diethylamine (0.66 mol) and 330 ml. of an 8% sodium hydroxide solution. After spray-drying in the Krause spray-dryer at a temperature of 90° to 100° C., 489 g. of a yellow solid powder were obtained with the following analytical data: acid No. =1.7; saponification No.=4.4; hydroxyl No.=24.5; N=1.89%; S=16.80%; Na=7.13%.

With another batch of the same type, the aqueous solution was bleached with $H_2O_2$ prior to spray-drying. For this purpose the solution, adjusted to a pH of 5 to 6 was reacted with 4% $H_2O_2$ (based on the crude sulfonation product) by heating over a period of 2 hours at 80° to 90° C. while gently stirring. After spray-drying, a practically colorless spray-dried powder as thus obtained.

The preceding specific embodiments are illustrative of the invention. It is to be understood that other expedients, as described or as known to those skilled in the art, may be employed without departing from the spirit of the invention or the scope of the appended claims.

We claim:

1. A process for the preparation of a mixture of surface-active compounds which comprises the steps of reacting an α-olefin having the formula $$R_3R_2R_1C\text{—}CH_2\text{—}CH\text{=}CH_2$$

wherein $R_1$, $R_2$ and $R_3$ are selected from the group consisting of hydrogen and aliphatic hydrocarbon, said olefin containing from 8 to 22 carbon atoms, with from about 1 mol to about 1.7 mols of gaseous sulfur trioxide at a temperature below 70° C., neutralizing the crude sulfonation mixture consisting essentially of a mixture of sulfonic acids and sultones with from 50% to 95%, based on the amount of sulfur trioxide reacted of an alkaline neutralization agent to give a neutralized sulfonation mixture consisting essentially of from 0.9 to 0.5 mol per mol of starting olefin of neutralized sulfonic acids and from 0.1 to 0.5 mol per mol of starting olefin of sultones, reacting the sultones present in the neutralized sulfonation mixture with a sultone-reacting reagent selected from the group consisting of amines, alkali metal alkanolates, alkali metal phenolates, alkali metal substituted phenolates, organic compounds containing a thiol group and thioureas, bleaching the mixture of surface-active compounds, and recovering said mixture of surface-active compounds.

2. The process of claim 1 wherein said bleaching is effected by the action of an alkali metal hypochlorite.

3. The process of claim 1 wherein said bleaching is effected by alkalinizing the mixture of surface-active compounds and introducing chlorine therein.

4. The process of claim 1 wherein said bleaching is effected by the action of hydrogen peroxide on the neutral to weakly acid mixture of surface-active compounds and thereafter by the action of an alkali metal hypochlorite.

5. The mixture of surface-active compounds produced by the process of claim 1.

6. A process for the preparation of a mixture of surface-active compounds which comprises the steps of reacting an α-olefin having the formula

wherein $R_1$, $R_2$ and $R_3$ are selected from the group consisting of hydrogen and aliphatic hydrocarbon radicals, said olefin containing from 8 to 22 carbon atoms, with from about 1 mol to about 1.7 mols of gaseous sulfur trioxide at a temperature below 70° C., neutralizing the crude sulfonation mixture consisting essentially of a mixture of sulfonic acids and sultones with from 50% to 95%, based on the amount of $SO_3$ reacted, of a neutralization agent selected from the group consisting of ammonium hydroxide, alkali metal hydroxides, alkali metal carbonates, alkylamines, dialkylamines, trialkylamines, alkylolamines, dialkylolamines, trialkylolamines and alkali metal lower alkanolates to give a neutralized sulfonation mixture consisting essentially of from 0.9 to 0.5 mol per mol of starting olefin of neutralized sulfonic acids and from 0.1 to 0.5 mol per mol of starting olefin of sultones, reacting the sultones present in the neutralized sulfonation mixture with a sultone-reacting reagent selected from the group consisting of amines, alkali metal alkanolates, alkali metal phenolates, alkali metal substituted phenolates, organic compounds containing a thiol group and thioureas, bleaching the mixture of surface-active compounds, and recovering said mixture of surface-active compounds.

7. The process of claim 6 wherein said neutralization is conducted in an inert solvent.

8. The process of claim 6 wherein said reaction with a sultone-reacting reagent is conducted in the presence of a solvent selected from the group consisting of water and inert organic solvents at a temperature from about room temperature to about 200° C.

9. The process of claim 6 wherein said sultone-reacting reagent is a trialkylamine.

10. The process of claim 6 wherein said alkaline neutralization agent and said sultone-reacting reagent are added simultaneously.

11. The process of claim 6 wherein said sultone-reacting reagent is added in an amount sufficient to react with all sultones present in said neutralized sulfonation mixture.

12. A process for the preparation of a mixture of surface-active compounds which comprises the steps of reacting an α-olefin having the formula

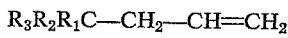

wherein $R_1$, $R_2$ and $R_3$ are selected from the group consisting of hydrogen and aliphatic hydrocarbon radicals, said olefin containing from 8 to 22 carbon atoms, with from about 1 mol to about 1.7 mols of gaseous sulfur trioxide in an inert gas at a temperature below 70° C., neutralizing the crude sulfonation mixture consisting essentially of a mixture of sulfonic acids and sultones with from 50% to 95%, based on the amount of $SO_3$ reacted, of an aqueous alkali metal hydroxide to give a neutralized sulfonation mixture consisting essentially of from 0.9 to 0.5 mol per mol of starting olefin of alkali metal sulfonates and from 0.1 to 0.5 mol per mol of starting olefin of sultones, reacting the sultones present in the neutralized sulfonation mixture with a sultone-reacting reagent selected from the group consisting of amines, alkali metal alkanolates, alkali metal phenolates, alkali metal substituted phenolates, organic compounds containing a thiol group and thioureas, bleaching the mixture of surface-active compounds at a temperature of from about 40° C. to about 200° C., and recovering said mixture of surface-active compounds.

References Cited

UNITED STATES PATENTS

| 2,875,125 | 2/1959 | Gaertner | 260—327 |
|---|---|---|---|
| 3,109,846 | 11/1963 | Klass et al. | 260—294.8 |
| 3,164,608 | 1/1965 | Blaser | 260—327 |
| 3,200,127 | 8/1965 | Klass | 260—327 |
| 3,235,549 | 2/1966 | Broussalian | 260—513 |
| 3,255,240 | 6/1966 | Wolfram et al. | 260—294.8 |

OTHER REFERENCES

Bordwell et al.: J. Am. Chem. Soc., vol 76, pp. 3952–3956 (1954).

LEON D. ROSDOL, *Primary Examiner.*

RICHARD D. LOVERING, *Assistant Examiner.*

U.S. Cl. X.R.

252—161; 260—293.47, 294.8, 327, 501.12, 513